United States Patent
Li et al.

(10) Patent No.: US 10,814,273 B2
(45) Date of Patent: Oct. 27, 2020

(54) METHOD FOR SIMULTANEOUSLY REMOVING $SO_2$ AND $NO_X$ IN FLUE GAS

(71) Applicant: Kunming University of Science and Technology, Kunming, Yunnan (CN)

(72) Inventors: Yingjie Li, Yunnan (CN); Senlin Tian, Yunnan (CN); Jianhong Huang, Yunnan (CN); Xuewei Hu, Yunnan (CN); Ping Ning, Yunnan (CN)

(73) Assignee: Kunming University of Science and Technology (CN)

( * ) Notice: Subject to any disclaimer, the term of this patent is extended or adjusted under 35 U.S.C. 154(b) by 0 days.

(21) Appl. No.: 16/601,661

(22) Filed: Oct. 15, 2019

(65) Prior Publication Data

US 2020/0129923 A1 Apr. 30, 2020

(30) Foreign Application Priority Data

Oct. 24, 2018 (CN) .......................... 2018 1 1242135

(51) Int. Cl.
*B01D 53/86* (2006.01)

(52) U.S. Cl.
CPC .. *B01D 53/8637* (2013.01); *B01D 2251/2062* (2013.01); *B01D 2255/1026* (2013.01);
(Continued)

(58) Field of Classification Search
CPC ...... B01D 53/502; B01D 53/56; B01D 53/60; B01D 53/78; B01D 53/86; B01D 2251/60; B01D 2251/80; B01D 2252/204; B01D 2255/1026; B01D 2257/302; B01D 2257/404; B01D 2258/0283; B01J 10/00; B01J 27/24; B01J 31/0237; B01J 23/462
See application file for complete search history.

(56) References Cited

U.S. PATENT DOCUMENTS

| | | | | |
|---|---|---|---|---|
| 5,320,816 A | * | 6/1994 | Tsai | B01D 53/60 204/238 |
| 2005/0061149 A1 | * | 3/2005 | Nieuwenhuizen | B01D 53/73 95/196 |
| 2008/0226540 A1 | * | 9/2008 | Felthouse | B01J 23/462 423/522 |

* cited by examiner

*Primary Examiner* — Timothy C Vanoy
(74) *Attorney, Agent, or Firm* — Lerner, David, Littenberg, Krumholz & Mentlik, LLP

(57) ABSTRACT

The invention discloses a method for simultaneously removing $SO_2$ and $NO_x$ in flue gas: uniformly mixing a water-soluble ruthenium salt with ammonia water to obtain an aqueous solution of a ruthenium-amine complex; subjecting the flue gas and the aqueous solution of the ruthenium-amine complex to a countercurrent contact reaction under the temperature of 5-60° C., pH of 7.5-12 to obtain a solution A and purified gas; discharging the solution A of the step (2) into a crystallization tank to crystallize and separate an ammonium salt to obtain a solution B, returning the solution B to replace the aqueous solution of the ruthenium-amine complex. The invention utilizes the ruthenium-amine complex having a strong capability of complexing with NO as well as residual oxygen in the flue gas to carry out liquid phase catalytic oxidation to convert the $NO_x$ into ammonium nitrate, and the removal efficiency of the $NO_x$ and the $SO_2$ is high.

5 Claims, 1 Drawing Sheet

(52) U.S. Cl.
CPC .. *B01D 2257/302* (2013.01); *B01D 2257/404* (2013.01); *B01D 2258/0283* (2013.01)

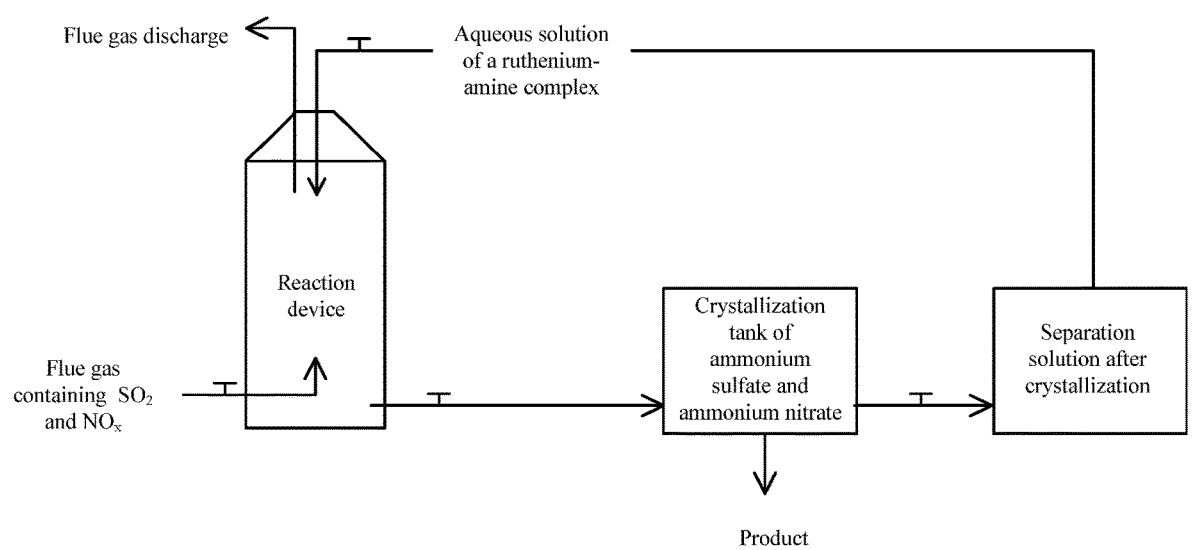

METHOD FOR SIMULTANEOUSLY REMOVING $SO_2$ AND $NO_x$ IN FLUE GAS

CROSS REFERENCE TO RELATED APPLICATIONS

This application claims priority from Chinese application number 201811242135.3, filed Oct. 24, 2018, the disclosure of which is hereby incorporated herein by reference.

TECHNICAL FIELD

The present invention relates to a method for simultaneously removing $SO_2$ and $NO_x$ in flue gas, and belongs to the technical field of environmental protection and comprehensive utilization.

BACKGROUND

At present, the most widely used desulfurization and denitration integrated technology in the market is not a simultaneous desulfurization and denitration technology, but a combination of mature desulfurization technology and denitration technology. For example, limestone desulfurization and selective catalytic reduction (SCR) denitration are combined to first desulfurize and then denitrify flue gas. This technology has problems such as large occupied area, complicated operation, high cost, and secondary pollution, which will limit the further popularization and application of the technology.

At present, integrated simultaneous desulfurization and denitrification technologies include an activated carbon (coke) method, a lime/urea injection method, an ozone method, a $H_2O_2$ method, and an ammonia method, etc.; they have poor $NO_x$ selectivity, low removal efficiency, high investment, high operating cost and energy consumption, low desulfurization and denitration effects, and secondary pollution, and thus cannot reach industrial operation scale. An electron beam irradiation method and a photocatalysis method cannot remove $NO_x$ completely, but are easy to produce $NH_3$ and $N_2O$ to cause secondary pollution, and have poor stability and high cost, and cannot recycle sulfur and nitrate. The integrated desulfurization and denitration technologies have a good effect on the removal of sulfur, but the removal of NO is not satisfactory, due to the poor water solubility and low reactivity of $NO_x$, especially NO (more than 90% of $NO_x$).

SUMMARY

In view of the problems of integrated simultaneous desulfurization and denitration in the prior art, the present invention provides a method for simultaneously removing $SO_2$ and $NO_x$ in flue gas, by which, trace oxygen in the flue gas reacts with NO under the catalysis of a ruthenium-amine complex catalyst to produce water-soluble $NO_2$, and the $NO_2$ is then removed by excess ammonia water in an aqueous solution of a ruthenium-amine complex while ammonium nitrate is produced; in the reaction system, the excess ammonia water fully reacts with $SO_2$ to realize simultaneous desulfurization and denitration of the flue gas and realize resource utilization of sulfur and nitrate; the ruthenium-amine complex for reaction can be regenerated by simple heating, thereby realizing the recycling of the catalyst and preventing secondary pollution.

A method for simultaneously removing $SO_2$ and $NO_x$ in flue gas, where the specific steps are as follows:

(1) uniformly mixing a water-soluble ruthenium salt with ammonia water to obtain an aqueous solution of a ruthenium-amine complex, where ruthenium ions in the aqueous solution of the ruthenium-amine complex have a concentration of 0.03-0.20 mol/L, and nitrogen in the ammonia water and ruthenium in the water-soluble ruthenium salt have a molar ratio of (8-50):1;

(2) subjecting the flue gas and the aqueous solution of the ruthenium-amine complex of the step (1) to a countercurrent contact reaction under the temperature of 5-60° C. and pH of 7.5-12 to obtain a solution A and purified gas, where oxygen in the flue gas has a volume content of 0.5%-10%, and the flue gas and the aqueous solution of the ruthenium-amine complex have a gas-liquid volume ratio of (0.05-8):1; and (3) discharging the solution A of the step (2) into a crystallization tank to crystallize and separate an ammonium salt to obtain a solution B, and returning the solution B to the step (2) to replace the aqueous solution of the ruthenium-amine complex;

where the water-soluble ruthenium salt is ruthenium trichloride or ruthenium iodide;

preferably, in the step (1), the ruthenium ions in the aqueous solution of the ruthenium-amine complex have a concentration of 0.08-0.15 mol/L, and the nitrogen in the ammonia water and the ruthenium in the water-soluble ruthenium salt have a molar ratio of (20-50):1;

preferably, in the step (2), the temperature is 15-40° C., and the pH is 9-12;

preferably, in the step (2), the flue gas and the aqueous solution of the ruthenium-amine complex have a gas-liquid volume ratio of (0.05-5):1.

The principle of the present invention is as follows:

the ruthenium-amine complex reacts with NO $$[Ru(NH_3)_6]^{3+}+NO \rightarrow [Ru(NH_3)_5(NO)]^{3+}+NH_3 \qquad (1)$$

the NO reacts with residual oxygen in the flue gas (regeneration of the ruthenium-amine complex)

$$[Ru(NH_3)_5(NO)]^{3+}+½O_2+NH_3 \rightarrow [Ru(NH_3)_6]^{3+}+NO_2 \qquad (2)$$

$NO_2$ reacts with the ammonia water $$2NO_2+2NH_3 \cdot H_2O+½O_2 \rightarrow 2NH_4NO_3+H_2O \qquad (3)$$

$SO_2$ reacts with the ammonia water $$SO_2+2NH_3 \cdot H_2O+½O_2 \rightarrow (NH_4)_2SO_4+H_2O \qquad (4)$$

The beneficial effects of the present invention are:

(1) the present invention constructs a closed circulation system for simultaneous desulfurization and denitration, and the types and usages of chemical agents are small, and the process is clean and environmentally friendly;

(2) the present invention utilizes the ruthenium-amine complex catalyst, which can simultaneously desulfurize and denitrify, and can regenerate by itself during the reaction process to avoid separate regeneration, thereby improving the stability of the process system and reducing investment and operation cost;

(3) the present invention can return for simultaneous desulfurization and denitrification, and the removal rate of $SO_2$ and $NO_x$ can be as high as 100%; and (4) the present invention can realize resource utilization of nitrogen and sulfur in the flue gas, thereby avoiding the abandonment of the nitrogen and sulfur resources by a conventional technology, and realizing high economic benefit.

BRIEF DESCRIPTION OF THE DRAWINGS

FIG. 1 is a schematic diagram of a ruthenium-amine complex desulfurization and denitration process.

DETAILED DESCRIPTION

The present invention will be further described in detail below with reference to specific implementations, but the protection scope of the present invention is not limited thereto.

Embodiment 1

In this embodiment, the flue gas to be treated is copper smelting flue gas, including 2,500 mg/m$^3$ of $SO_2$, 300 mg/m$^3$ of $NO_x$, and 0.5% of $O_2$ (volume content).

As shown in FIG. 1, a method for simultaneously removing $SO_2$ and NO in flue gas, where the specific steps are as follows:

(1) uniformly mix a water-soluble ruthenium salt with ammonia water to obtain an aqueous solution of a ruthenium-amine complex, where ruthenium ions in the aqueous solution of the ruthenium-amine complex have a concentration of 0.03 mol/L, and nitrogen in the ammonia water and ruthenium in the water-soluble ruthenium salt have a molar ratio of 8:1;

(2) add the flue gas and the aqueous solution of the ruthenium-amine complex of the step (1) to a reaction device for a countercurrent contract reaction under the temperature of 5° C. and pH of 8.0 to obtain a solution A and purified gas, where oxygen in the flue gas has a volume content 0.5%, and the flue gas and the aqueous solution of the ruthenium-amine complex have a gas-liquid volume ratio of 0.05:1; and (3) discharge the solution A of the step (2) into a crystallization tank to crystallize and separate an ammonium salt to obtain a solution B, and return the solution B to the step (2) to replace the aqueous solution of the ruthenium-amine complex;

by analysis by an industrial mass spectrometer, an emission concentration of $SO_2$ in a gas outlet is 65 mg/m$^3$, and an emission concentration of $NO_x$ is 15 mg/m$^3$.

Embodiment 2

In this embodiment, the flue gas to be treated is copper smelting flue gas, including 3,000 mg/m$^3$ of $SO_2$, 250 mg/m$^3$ of $NO_x$, and 2% of $O_2$ (volume content).

As shown in FIG. 1, a method for simultaneously removing $SO_2$ and $NO_x$ in flue gas, where the specific steps are as follows:

(1) uniformly mix a water-soluble ruthenium salt with ammonia water to obtain an aqueous solution of a ruthenium-amine complex, where ruthenium ions in the aqueous solution of the ruthenium-amine complex have a concentration of 0.08 mol/L, and nitrogen in the ammonia water and ruthenium in the water-soluble ruthenium salt have a molar ratio of 15:1;

(2) add the flue gas and the aqueous solution of the ruthenium-amine complex of the step (1) to a reaction device for a countercurrent contract reaction under the temperature of 20° C. and pH of 9.0 to obtain a solution A and purified gas, where oxygen in the flue gas has a volume content 2%, and the flue gas and the aqueous solution of the ruthenium-amine complex have a gas-liquid volume ratio of 2:1; and (3) discharge the solution A of the step (2) into a crystallization tank to crystallize and separate an ammonium salt to obtain a solution B, and return the solution B to the step (2) to replace the aqueous solution of the ruthenium-amine complex;

by analysis by an industrial mass spectrometer, an emission concentration of $SO_2$ in a gas outlet is 50 mg/m$^3$, and an emission concentration of $NO_x$ is 8 mg/m$^3$.

Embodiment 3

In this embodiment, the flue gas to be treated is copper smelting flue gas, including 2,800 mg/m$^3$ of $SO_2$, 270 mg/m$^3$ of $NO_x$, and 5% of $O_2$ (volume content).

As shown in FIG. 1, a method for simultaneously removing $SO_2$ and $NO_x$ in flue gas, where the specific steps are as follows:

(1) uniformly mix a water-soluble ruthenium salt with ammonia water to obtain an aqueous solution of a ruthenium-amine complex, where ruthenium ions in the aqueous solution of the ruthenium-amine complex have a concentration of 0.15 mol/L, and nitrogen in the ammonia water and ruthenium in the water-soluble ruthenium salt have a molar ratio of 40:1;

(2) add the flue gas and the aqueous solution of the ruthenium-amine complex of the step (1) to a reaction device for a countercurrent contract reaction under the temperature of 40° C. and pH of 10.0 to obtain a solution A and purified gas, where oxygen in the flue gas has a volume content 5%, and the flue gas and the aqueous solution of the ruthenium-amine complex have a gas-liquid volume ratio of 5:1; and (3) discharge the solution A of the step (2) into a crystallization tank to crystallize and separate an ammonium salt to obtain a solution B, and return the solution B to the step (2) to replace the aqueous solution of the ruthenium-amine complex;

by analysis by an industrial mass spectrometer, an emission concentration of $SO_2$ in a gas outlet is 19 mg/m$^3$, and an emission concentration of NO is 3.2 mg/m$^3$.

Embodiment 4

In this embodiment, the flue gas to be treated is copper smelting flue gas, including 3,500 mg/m$^3$ of $SO_2$, 330 mg/m$^3$ of $NO_x$, and 10% of $O_2$ (volume content).

As shown in FIG. 1, a method for simultaneously removing $SO_2$ and NO in flue gas, where the specific steps are as follows:

(1) uniformly mix a water-soluble ruthenium salt with ammonia water to obtain an aqueous solution of a ruthenium-amine complex, where ruthenium ions in the aqueous solution of the ruthenium-amine complex have a concentration of 0.2 mol/L, and nitrogen in the ammonia water and ruthenium in the water-soluble ruthenium salt have a molar ratio of 60:1;

(2) add the flue gas and the aqueous solution of the ruthenium-amine complex of the step (1) to a reaction device for a countercurrent contract reaction under the temperature of 60° C. and pH of 12.0 to obtain a solution A and purified gas, where oxygen in the flue gas has a volume content 10%, and the flue gas and the aqueous solution of the ruthenium-amine complex have a gas-liquid volume ratio of 8:1; and (3) discharge the solution A of the step (2) into a crystallization tank to crystallize and separate an ammonium salt to obtain a solution B, and return the solution B to the step (2) to replace the aqueous solution of the ruthenium-amine complex;

by analysis by an industrial mass spectrometer, an emission concentration of $SO_2$ in a gas outlet is 22 mg/m$^3$, and an emission concentration of NO is 4.3 mg/m$^3$.

Comparative Example

The flue gas to be treated is copper smelting flue gas, including 2,800 mg/m$^3$ of $SO_2$, 270 mg/m$^3$ of $NO_x$, and 5% of $O_2$ (volume content).

The copper smelting flue gas is used as to-be-treated gas, and ammonia water is added into a reaction device to fully react with $SO_2$ and $NO_x$ in the copper smelting flue gas by countercurrent contact; a gas-liquid ratio of the flue gas to aqueous ammonia is controlled to be 5, the reaction temperature is 40° C., and the reaction pH was 10; emission concentrations of the $SO_2$ and $NO_x$ in a gas outlet are analyzed by an industrial mass spectrometer to be 80 mg/m$^3$ and 212 mg/m$^3$, respectively.

What is claimed is:

1. A method for simultaneously removing $SO_2$ and $NO_x$ in flue gas, wherein the specific steps are as follows:
   (1) uniformly mixing a water-soluble ruthenium salt with ammonia water to obtain an aqueous solution of a ruthenium-amine complex, wherein ruthenium ions in the aqueous solution of the ruthenium-amine complex have a concentration of 0.03-0.20 mol/L, and nitrogen in the ammonia water and ruthenium in the water-soluble ruthenium salt have a molar ratio of (8-50):1;
   (2) subjecting the flue gas and the aqueous solution of the ruthenium-amine complex of the step (1) to a counter-current contact reaction under the temperature of 5-60° C. and pH of 7.5-12 to obtain a solution A and purified gas, wherein oxygen in the flue gas has a volume content of 0.5%-10%, and the flue gas and the aqueous solution of the ruthenium-amine complex have a gas-liquid volume ratio of (0.05-8):1; and
   (3) discharging the solution A of the step (2) into a crystallization tank to crystallize and separate an ammonium salt to obtain a solution B, and returning the solution B to the step (2) to replace the aqueous solution of the ruthenium-amine complex.

2. The method for simultaneously removing $SO_2$ and $NO_x$ in flue gas according to claim 1, wherein the water-soluble ruthenium salt is one or a mixture of two of ruthenium trichloride and ruthenium iodide.

3. The method for simultaneously removing $SO_2$ and $NO_x$ in flue gas according to claim 1, wherein in the step (1), the ruthenium ions in the aqueous solution of the ruthenium-amine complex have a concentration of 0.08-0.15 mol/L, and the nitrogen in the ammonia water and the ruthenium in the water-soluble ruthenium salt have a molar ratio of (20-50):1.

4. The method for simultaneously removing $SO_2$ and $NO_x$ in flue gas according to claim 1, wherein in the step (2), the temperature is 15-40° C., and the pH is 9-12.

5. The method for simultaneously removing $SO_2$ and $NO_x$ in flue gas according to claim 1, wherein in the step (2), the flue gas and the aqueous solution of the ruthenium-amine complex have a gas-liquid volume ratio of (0.05-5):1.

* * * * *